United States Patent
Dahlfort et al.

(10) Patent No.: US 9,184,842 B2
(45) Date of Patent: Nov. 10, 2015

(54) APPARATUS FOR COMMUNICATING A PLURALITY OF ANTENNA SIGNALS AT DIFFERENT OPTICAL WAVELENGTHS

(75) Inventors: Stefan Dahlfort, Santa Clara, CA (US); Kim Laraqui, Solna (SE); Kåre Gustafsson, Stockholm (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 616 days.

(21) Appl. No.: 13/351,043

(22) Filed: Jan. 16, 2012

(65) Prior Publication Data
US 2013/0089336 A1    Apr. 11, 2013

Related U.S. Application Data

(60) Provisional application No. 61/544,137, filed on Oct. 6, 2011.

(51) Int. Cl.
| | |
|---|---|
| *H04B 10/00* | (2013.01) |
| *H04B 10/27* | (2013.01) |
| *H04B 10/24* | (2006.01) |
| *H04B 10/2575* | (2013.01) |
| *H04J 14/02* | (2006.01) |

(52) U.S. Cl.
CPC ...... *H04B 10/25759* (2013.01); *H04J 14/0282* (2013.01)

(58) Field of Classification Search
CPC .............. H04B 10/25753; H04B 10/1125; H04B 10/25752; H04B 10/25759; H04B 10/2575; H04J 3/0682
USPC ................................................ 398/115, 116
See application file for complete search history.

(56) References Cited

U.S. PATENT DOCUMENTS

| | | | |
|---|---|---|---|
| 5,339,184 A * | 8/1994 | Tang | 398/116 |
| 2003/0025957 A1* | 2/2003 | Jayakumar | 359/110 |
| 2003/0072055 A1* | 4/2003 | Mickelsson et al. | 359/124 |
| 2004/0057543 A1* | 3/2004 | Huijgen et al. | 375/356 |
| 2005/0078774 A1* | 4/2005 | Rick et al. | 375/344 |
| 2005/0239428 A1* | 10/2005 | Seendripu et al. | 455/280 |
| 2006/0182446 A1* | 8/2006 | Kim et al. | 398/72 |
| 2008/0063397 A1* | 3/2008 | Hu et al. | 398/43 |
| 2008/0089689 A1* | 4/2008 | Sakama | 398/115 |
| 2008/0145056 A1* | 6/2008 | Boldi et al. | 398/96 |

(Continued)

FOREIGN PATENT DOCUMENTS

| | | |
|---|---|---|
| KR | 200800987 U | 5/2008 |
| WO | WO 2010/025767 A1 | 3/2010 |
| WO | WO 2010/137117 A1 | 12/2010 |

OTHER PUBLICATIONS

CPRI Specification V4.2, Common Public Radio Interface (CPRI); Interface Specification, Sep. 29, 2010, the whole document.

*Primary Examiner* — Oommen Jacob

(57) ABSTRACT

A remote radio unit is disclosed that includes antenna interfaces, RF receivers, and a digital-to-optical converter. The antenna interfaces each receive an antenna signal from a different antenna. The RF receivers downconvert the antenna signals to baseband signals, and convert the baseband signals to digital streams of user data. The digital-to-optical converter converts each of the digital streams of user data to optical signals having different optical wavelengths for output to an optical fiber for communication to a radio equipment control unit. Related radio base stations and network control points are disclosed.

6 Claims, 10 Drawing Sheets

(56) References Cited

U.S. PATENT DOCUMENTS

| | | | |
|---|---|---|---|
| 2008/0253353 A1* | 10/2008 | Feher | 370/347 |
| 2009/0180423 A1 | 7/2009 | Kroener | |
| 2009/0232507 A1* | 9/2009 | Gupta et al. | 398/115 |
| 2009/0316608 A1* | 12/2009 | Singh et al. | 370/280 |
| 2009/0316609 A1* | 12/2009 | Singh | 370/280 |
| 2010/0098433 A1* | 4/2010 | Boyd et al. | 398/155 |
| 2010/0130156 A1* | 5/2010 | Jin et al. | 455/296 |
| 2010/0189439 A1* | 7/2010 | Novak et al. | 398/67 |
| 2010/0278530 A1* | 11/2010 | Kummetz et al. | 398/41 |
| 2011/0081877 A1* | 4/2011 | Seendripu et al. | 455/196.1 |
| 2011/0135013 A1* | 6/2011 | Wegener | 375/241 |
| 2011/0188858 A1* | 8/2011 | Kim et al. | 398/66 |
| 2011/0188862 A1* | 8/2011 | Fuss et al. | 398/115 |
| 2012/0163819 A1* | 6/2012 | Mun et al. | 398/75 |
| 2013/0089336 A1* | 4/2013 | Dahlfort et al. | 398/115 |
| 2013/0129353 A1* | 5/2013 | Tan et al. | 398/66 |

* cited by examiner

APPARATUS FOR COMMUNICATING A PLURALITY OF ANTENNA SIGNALS AT DIFFERENT OPTICAL WAVELENGTHS

RELATED APPLICATIONS

The present application claims the benefit of priority from U.S. Provisional Application No. 61/544,137 entitled "WDM-based Mobile Backhaul with Smart Metro for Remote Radio Units—The Antenna-lambda Connection" filed Oct. 6, 2011, the disclosure of which is hereby incorporated herein in its entirety by reference.

TECHNICAL FIELD

The present invention relates to communications systems and, more particularly, to communication of signals between remote radio units and radio control units in communications systems.

BACKGROUND

In a mobile communications system, a backhaul network can separate a radio base station into base band units, also referred to as main units (MU), and remote radio units (RRUs). An example conventional mobile communications system is shown in FIG. 1 and includes three RRUs 100 that are connected by a network 120 to one or more MUs 130. The MUs 130 can be centralized and located tens of kilometers from the RRUs 100, which are placed close to radio antennas 102 which may be mounted on masts/towers. Colocating the RRUs 100 and serviced antennas 102 minimizes/reduces feeder and jumper losses, which can increase uplink capacity of mobile services by the communications system.

This main-remote system architecture is gaining significant interest and has some clear advantages, e.g. when the RRUs 100 are installed close to the antennas 102. Example products that can be used in a main-remote system architecture are the Antenna-Integrated Radio (AIR) products and the Micro/Small RRU products manufactured by Telefonaktiebolaget L M Ericsson.

The interface between the MUs 130 and RRUs 100 is typically an optical interface carrying NRZ signals, which are formed by sampling I-Q air waveform signals received from antennas 102. Sampling the air waveform reduces complexity of the RRUs 100, but leads to very high bitrates that are output through the optical interface from each RRU 100, e.g., on the order of 1.25 Gbps per antenna 102.

A typical RRU location has many RRUs 100 and antennas 102. To reduce the required number of fibers that communicatively connect all RRUs 100 at the RRU location to the MUs 130, the RRUs 100 are daisy-chained to generate a multiplexed digital output signal of up to 10 Gbps, which is presently the highest rate supported by the Common Public Radio Interface (CPRI) protocol generally used between a RRU and MU. The digital output from the RRUs 100 can therefore pass through a time division multiplexer 110 that time division multiplexes the digital output signals from each of the RRUs 100 into different time slots for a same optical wavelength provided to the network 120.

The very high data rates output from a RRU location, presently up to around 10 Gbps, necessitate the use of expensive electro-optics equipment to interconnect the RRUs 100 and MUs 130. Moreover, because the RRUs 100 are daisy chained while using the CPRI protocol, the antennas 102 become "invisible" to the metro optical network because the network 120 sees an aggregation of the antennas 102 on any one of the optical wavelengths.

For mobile backhaul, it is desirable to re-use low cost passive optical network (PON) technology which is presently available at high volumes (e.g., millions/year) for use in fixed access networks. However, 10 Gbps PON technology is presently available at substantially lower volumes for fixed access networks and, therefore, is relatively expensive, especially when deployed in large numbers in very dense networks.

The approaches and presently recognized problems described above in this section could be pursued, but are not necessarily approaches and/or problems that have been previously conceived or pursued. Therefore, unless otherwise clearly indicated herein, the approaches and problems described above in this section are not prior art to claims in this application and any application claiming priority from this application and are not admitted to be prior art by inclusion in this section

SUMMARY

It is therefore an object to address at least some of the above mentioned disadvantages and/or to improve performance in a communications system.

Some embodiments of the present invention are directed to a remote radio unit that includes antenna interfaces, RF receivers, and a digital-to-optical converter. The antenna interfaces each receive an antenna signal from a different antenna. The RF receivers downconvert the antenna signals to baseband signals, and convert the baseband signals to digital streams of user data. The digital-to-optical converter converts each of the digital streams of user data to optical signals having different optical wavelengths for output to an optical fiber for communication to a radio equipment control unit.

Because the antenna signals are mapped to different optical wavelengths, the antenna signals are separately distinguishable within a network domain. The network may thereby separately control the communication and/or routing of data from one or more particular antennas.

Some other embodiments of the present invention are directed to a radio base station that includes a plurality of remote radio units, a data transport network, and a radio equipment control unit. The remote radio units each receive antenna signals from a different antenna, downconvert each the antenna signals to a baseband signal, convert each of the baseband signals to a digital stream of user data, and convert each of the digital streams of user data to optical signals having different optical wavelengths for output to an optical fiber for communication to a radio equipment control unit. The data transport network includes a plurality of optical fibers communicatively connected to each of the remote radio units to receive the optical signals. The radio equipment control unit is connected to the data transport network to receive the optical signals, and configured to select among the remote radio units and generate control data that is communicated through the data transport network to control operation of the selected remote radio unit.

The network control point may contain resource information that identifies which antennas of each of the remote radio units are transported by which wavelengths on which optical fibers of the data transport network. The network control point can select a digital stream of user data from a particular antenna of a particular remote radio unit responsive to the resource information, and control routing of the selected digital stream of user data through the data transport network.

The network control point may determine bandwidth utilization information for a plurality of optical fibers of the data transport network, and map the digital streams of user data for output among selected ones of the optical fibers responsive to the bandwidth utilization information.

The network control point may receive utilization information for the radio equipment control units, and map the digital streams of user data for output through optical fibers of the data transport network for transport to selected ones of the radio equipment control units responsive to the utilization information.

Some other embodiments of the present invention are directed to a network control point that includes a Common Public Radio Interface, CPRI, point device. The CPRI point device receives a plurality of optical signals transported by a plurality of optical fibers from a plurality of remote radio units. The CPRI point device further performs an optical-to-electrical conversion on the optical signals to detect a plurality of streams of user data each being transported by a different optical wavelength. Each of the streams of user data includes Inphase data and Quadrature data from different antennas of the remote radio units.

Other remote radio units, radio base stations, and network control points according to embodiments of the invention will be or become apparent to one with skill in the art upon review of the following drawings and detailed description. It is intended that all such additional radio units, radio base stations, and network control points be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

In the following detailed description, numerous specific details are set forth in order to provide a thorough understanding of various embodiments of the invention. However, it will be understood by those skilled in the art that the present invention may be practiced without these specific details. In other instances, well-known methods, procedures, components and circuits have not been described in detail so as not to obscure the present invention.

The following example embodiments may provide a number of advantages and benefits relative to conventional mobile communications systems and methods for communicating between RRUs and MUs. It will be appreciated by those skilled in the art in view of the present description, however, that the invention is not limited to these embodiments which produce any or all of these advantages or benefits and that other advantages and benefits may be realized depending upon the particular implementation.

Various embodiments of the present invention are directed to increasing the controllability of data that is being communicated from geographically distributed RRUs to MUs through network components, and reducing the complexity and cost of the associated equipment. In accordance with some embodiments, data received by individual antennas connected to a RRU is converted to different optical wavelengths for communication through a shared optical fiber toward one or more MUs.

Figure 2:
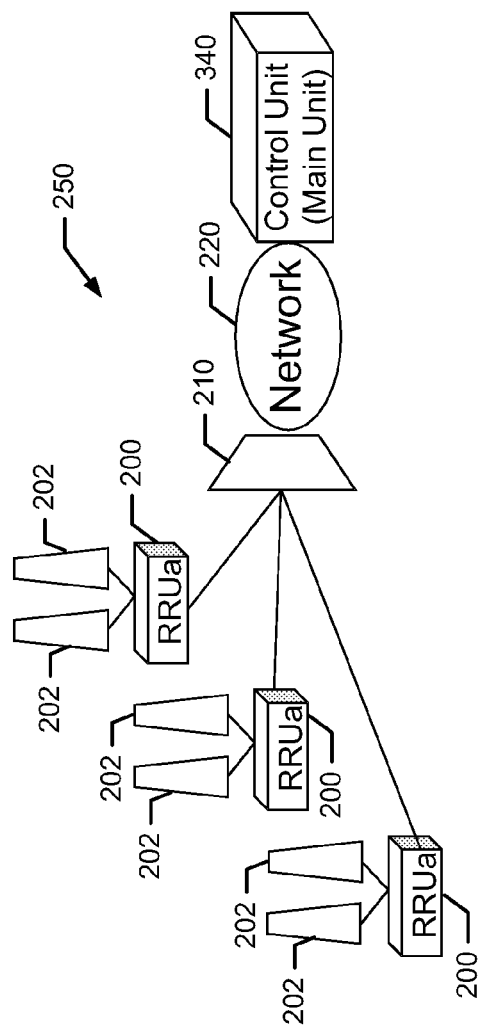
FIG. 2 is a block diagram of a mobile communications system according to some embodiments of the present invention.

FIG. 2 is a block diagram of a mobile communications system 250 that is configured according to some embodiments of the present invention. In the system of FIG. 2, a plurality of geographically distributed antennas 202 are communicatively connected to one or more MUs 340 through RRUs 200 and a network 210. The MUs 340 are configured to control transmission and reception of wireless communications by the RRUs 200, and therefore are also referred to as "control units". This embodiment and other embodiments are not limited to the example configuration of FIG. 2 and may include any number of RRUs, network elements, and MUs.

As will be explained in further detail below, each of the RRUs 200 includes antenna interfaces 1500 that each receive an antenna signal from a different one of the antennas 202. RF receivers 1502 within each RRU 200 downconvert the antenna signals to baseband signals, and convert the baseband signals to digital streams of Inphase (I) data and Quadrature (Q) data. A multiplexer 1504 multiplexes the Inphase data and Quadrature data from each antenna 202 into respective serial data streams. A digital-to-optical converter 1506 converts each of the serial digital streams to optical signals having different optical wavelengths for output to an optical fiber for communication toward one or more of the MUs 340. In this manner, the antenna-carriers (IQ) data (the basic unit of information received by the antennas 202) can be mapped to different optical wavelengths (the basic unit in wave division multiplex passive optical network (WDM-PON) systems) used by a passive optical network. An optical multiplexer 210 combines the optical signals from each of the RRUs 200 for aggregated output though an optical fiber of the network 220 for communication toward one or more MUs 340. Thus, each antenna carrier (AxC) is mapped onto a different optical wavelength, which functions as a physical port.

Because data from each antenna is carried by a different optical wavelength, each antenna's data is visible within a network domain (e.g., metro network), which facilitates the metro network equipment being able to separately control the communication and/or routing of data from one or more particular antennas. Various equipment and operations of the network domain, such as generalized multi-protocol label switching (GMPLS) operations, can thereby be used to control the communication and/or routing of data from one or more selected antennas.

Moreover, when the individual wavelengths enter into the metro/aggregation network, they automatically enter the realm of Packet-Opto Integration Node (POINT) control and management planes, enabling each antenna-carrier signal wavelength to be separately visible to these planes and registered in appropriate "connectivity" databases. The data transport operations therefore can have separate visibility to data from each of the antennas. After processing by the control and management planes, the antenna-carrier signal wavelengths may be forwarded individually or, in some embodiments, may preferably be multiplexed through centrally located and shared CPRI multiplexers in the aggregation network, before being forwarded towards the MU and/or baseband unit (BBU). CPRI multiplexing can be used to "pack" the antenna-carrier signal wavelengths before entering the transport core domain (where the cost of individual wavelength transport is more expensive), and/or to achieve higher rates on individual wavelengths when a higher speed optical interface is available at the MU/BBUs.

CPRI multiplexing and/or demultiplexing in the POINT equipment can increase the use of connectivity in the metro network by, for example, leveraging GMPLS and/or other control/AOM mechanisms from POINT.

Because data output from each RRU 200 is carried by different optical fibers to the multiplexer 210 (e.g., a passive optical combiner), lower speed optical components can be used at the RRUs 210. For example, relatively low cost 1.25 Gbps electro-optical components and fibers, which are available from WDM-PON applications, may be used for the mobile backhaul between the RRUs 200 and MUs 340. Moreover, CPRI multiplexing can be used to further aggregate the RRU signals for communication through an aggregation network to, for example, accommodate capabilities of the MUs 340 (e.g. when the MUs support higher data rates) and/or network transport capabilities (e.g. to increase packing of IQ data to utilize higher rate core transport networks).

Figure 3:
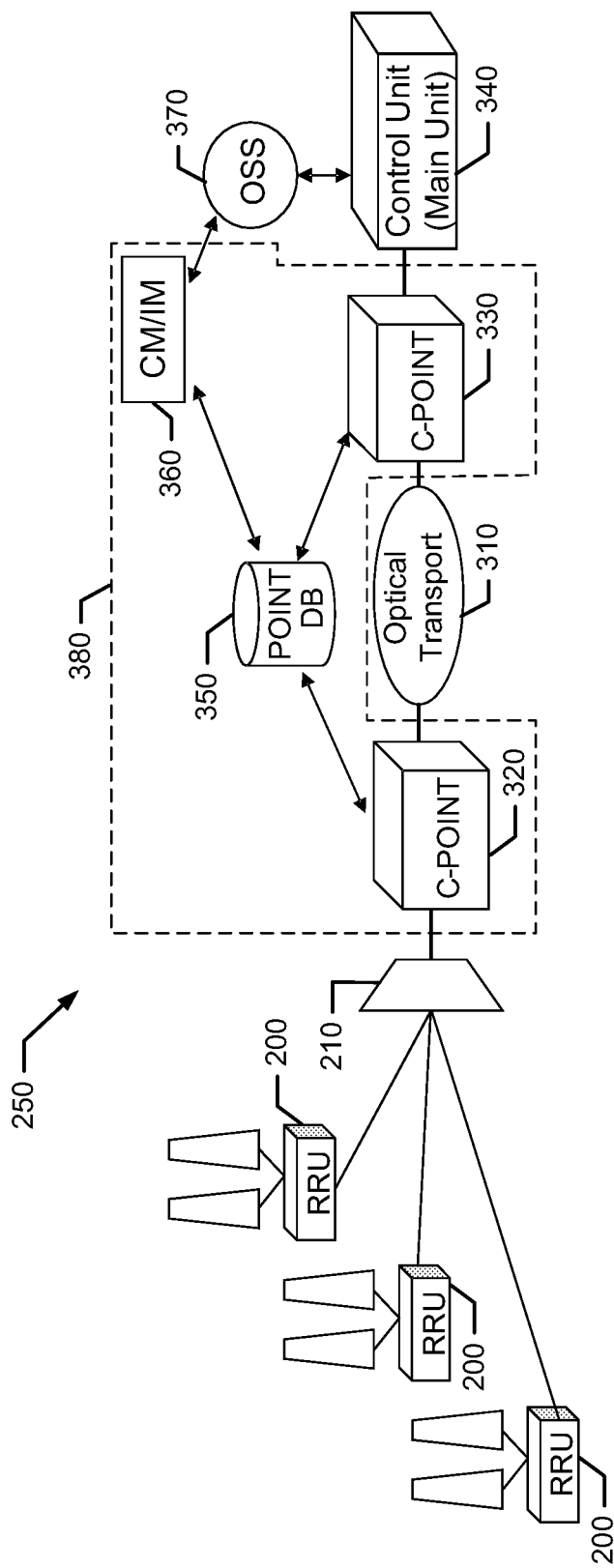
FIG. 3 is a more detailed block diagram of the mobile communications system of FIG. 2 configured to support the CPRI protocol.

FIG. 3 is a more detailed block diagram of the mobile communications system of FIG. 2 configured to support the CPRI protocol. The mobile communications system forms one or more radio base station for communicating mobile communication terminals, such as cell phones, data terminals, etc. Referring to FIG. 3, a pair of CPRI multiplexer/demultiplexers 320 and 330 (referred to as "C-POINTs", C-Packet-Opto Integration Nodes, and network control points) communicatively connect the RRUs 200 and MUs 340 to an optical data transport network 310. The C-POINTs 320,330 can be configured to provide similar control and management functionality as a POINT in a metro/aggregation network. The C-POINTs 320,330 can be collocated with respective POINT nodes and can share their facilities, such as sharing optical transport and connectivity control mechanisms.

As explained above regarding FIG. 2, each of the RRUs 200 is configured to receive antenna signals from a plurality of antennas, to downconvert each the antenna signals to a baseband signal, to convert each of the baseband signals to a digital stream of user data, and to convert each of the digital streams of user data to optical signals having different optical wavelengths for output to an optical fiber for communication to one or more RRUs 340. The (optical) data transport network 220 includes a plurality of optical fibers that connect to each of the RRUs 200 to receive the optical signals. The RRUs 340 are connected to the data transport network 220 to receive the optical signals, to select among the RRUs 200 and generate control data that is communicated through the data transport network 220 to control operation of the selected RRU 200.

The system further includes a point database (POINT DB) node 350, a configuration management inventory management (CM/IM) node 360, and an operations support system (OSS) node 370. The C-POINTs 320,330 and POINT DB node 350 and CM/IM node 360 are collectively referred to as a network control point 380.

Each of the C-POINTs 320,330 is configured to receive a plurality of optical signals transported by a plurality of optical fibers from the RRUs 200, and to perform an optical-to-electrical conversion on the optical signals to detect a plurality of streams of user data each being transported by a different optical wavelength. Each of the streams of user data can include Inphase data and Quadrature data from different antennas 202 of the RRUs 200.

Figure 10:
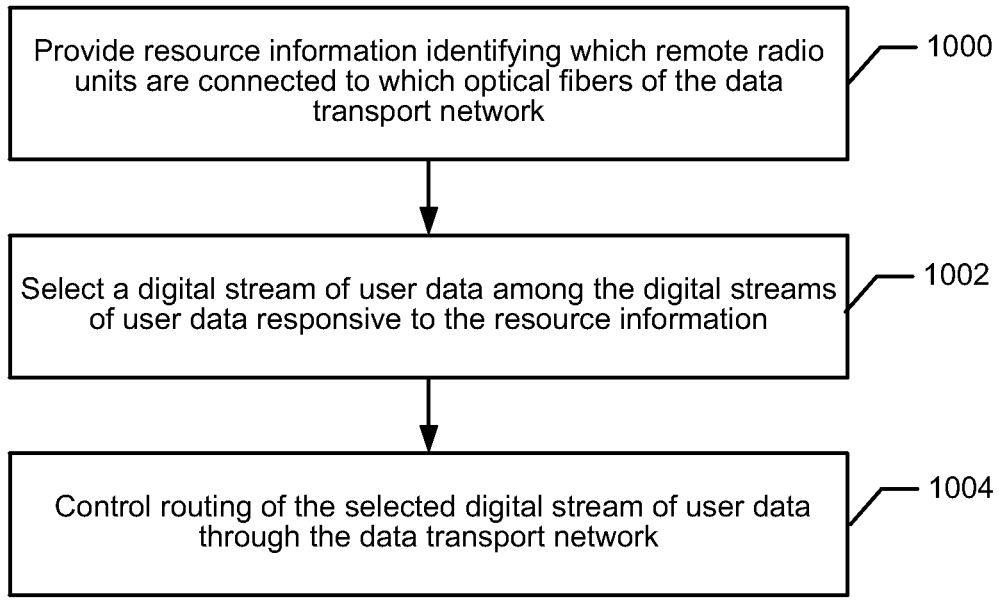

Reference is made to FIG. 3 and the flowchart of FIG. 10 of operations and methods that may be performed by the network control point 380 according to one embodiment. Resource information can be provided (block 1000) within the network control point 380 that identifies which RRUs 200 are connected to which optical fibers of the data transport network 310. The network control point 380 can select (block 1002) a digital stream of user data from among the digital streams of user data responsive to the resource information. The network control point 380 can control (block 1004) routing of the selected digital stream of user data through the data transport network 310

Figure 11:
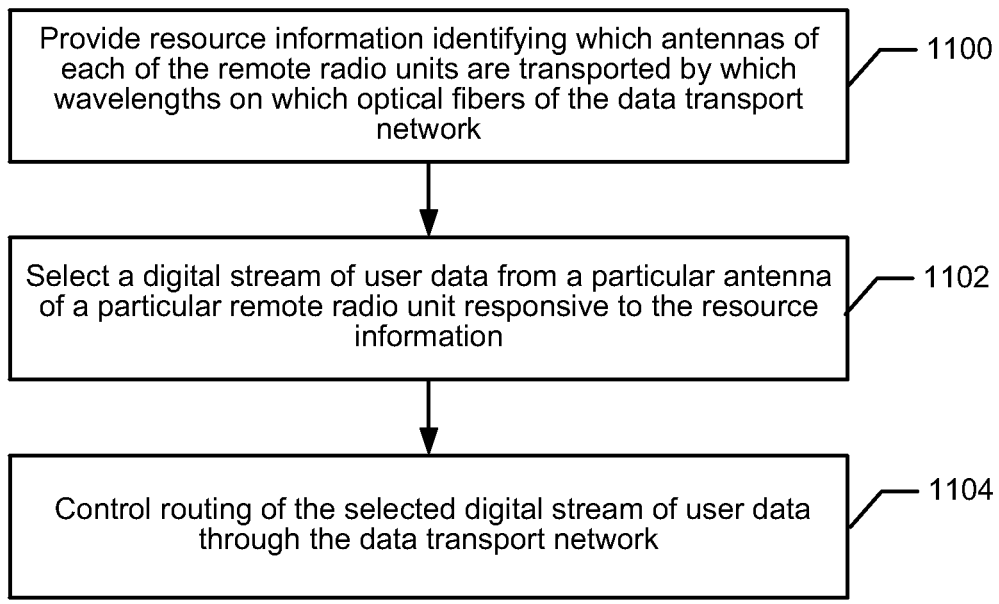

A further embodiment is explained with reference to FIG. 3 and the flowchart of FIG. 11 of operations and methods that may be performed by the network control point 380. Resource information can be provided (block 1100) within the network control point 380 that identifies which antennas 202 of each of the RRUs 200 are transported by which wavelengths on which optical fibers of the data transport network 310. The network control point 380 selects (block 1102) a digital stream of user data from a particular antenna 202 of a particular RRU 200 responsive to the resource information. The network control point 380 controls (block 1104) routing of the selected digital stream of user data through the data transport network 310. Accordingly, the network control point 380 can select and route a particular data stream from a particular antenna for communication through the data transport network 310 to a particular MU 340.

Figure 12:
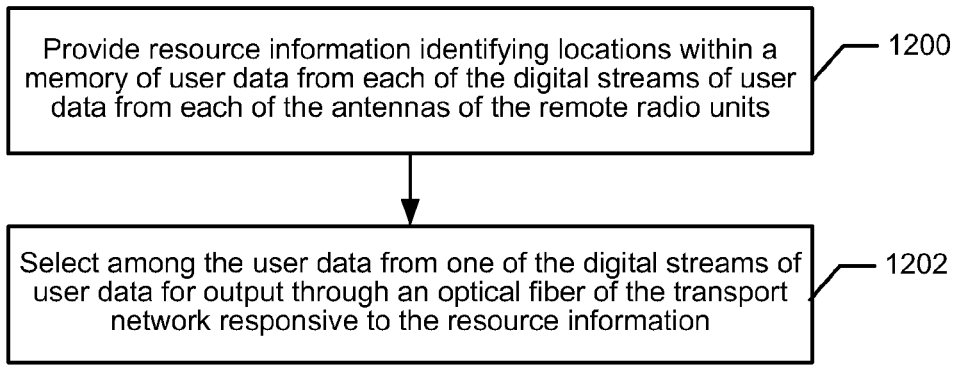

FIG. 12 illustrates a flowchart of operations and methods that may be performed by the network control point 380 according to another embodiment. Resource information can be provided (block 1200) within the network control point 380 that identifies locations within a memory of user data from each of the digital streams of user data from each of the antennas 202 of the RRUs 200. The network control point 380 selects (block 1202) among the user data from one of the digital streams of user data for output through an optical fiber of the data transport network 310 responsive to the resource information. The network control point 380 may further select user data from a plurality of the digital streams of user data responsive to the resource information, and multiplex the selected user data for output through the optical fiber of the data transport network 310.

Figure 13:
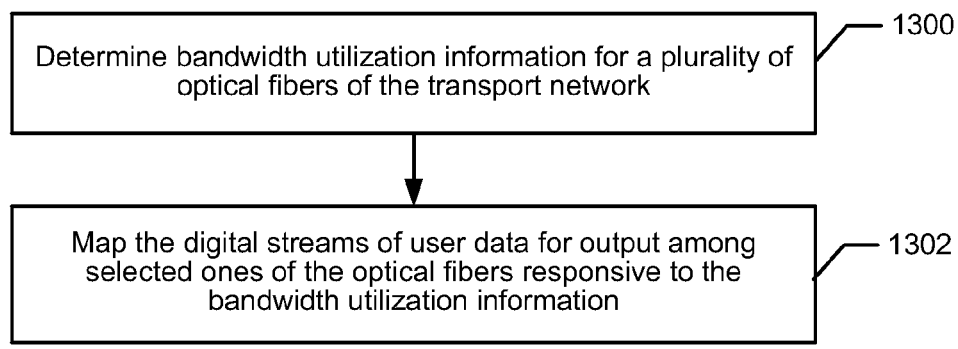

FIG. 13 illustrates a flowchart of operations and methods that may be performed by the network control point 380 according to another embodiment. The network control point 380 determines (block 1300) bandwidth utilization information for a plurality of optical fibers and wavelengths of the data transport network 310. The network control point 380 maps (block 1302) the digital streams of user data for output among selected ones of the optical fibers responsive to the bandwidth utilization information. Accordingly, the network control point 380 can adapt to varying bandwidth loading (e.g., underutilization, overutilization, transport failure, etc.) of the optical fibers and wavelengths by mapping and remapping individual ones of the digital streams of user data to different optical fibers and wavelengths to obtain a desired fiber bandwidth utilization.

Figure 14:
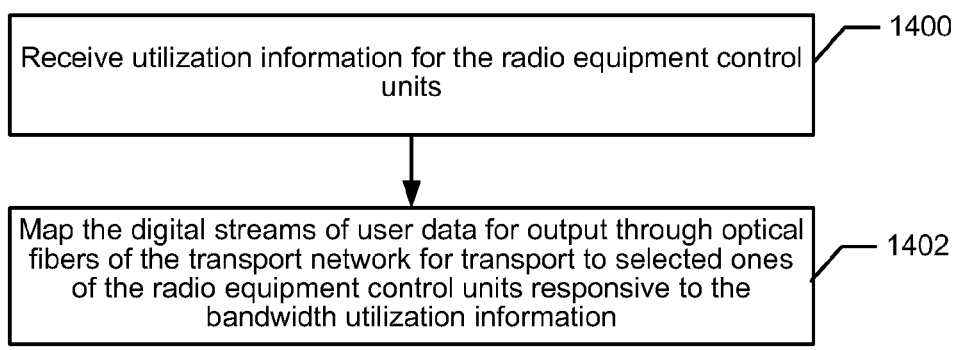
Figure 15:
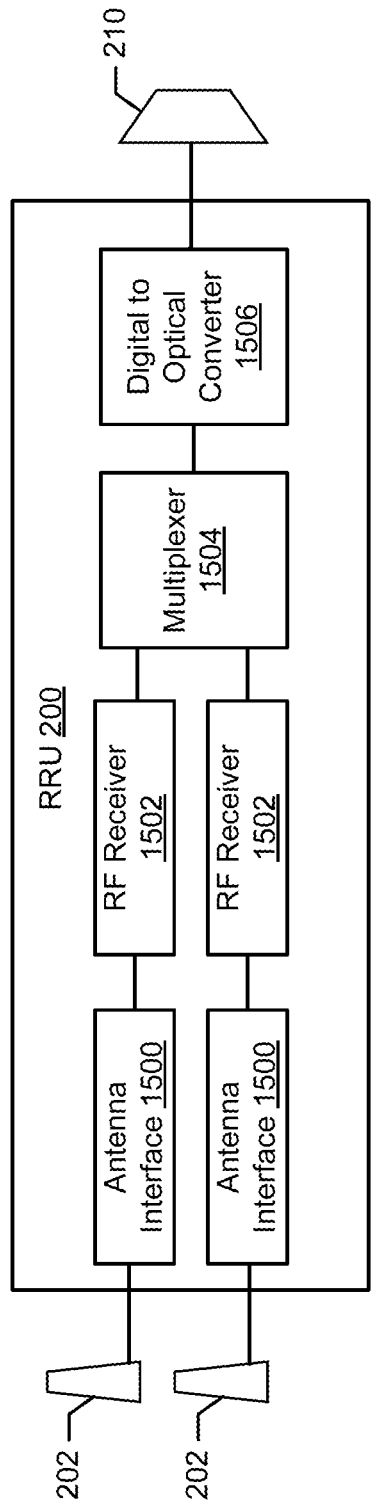
FIG. 15 is a block diagram of a RRU.

FIG. 14 illustrates a flowchart of operations and methods that may be performed by the network control point 380 according to another embodiment. The network control point 380 receives (block 1400) utilization information for one or more of the MUs 340. The utilization information for the MUs 340 may indicate a present loading of each of the MUs 340 and/or indicate other availability of each MU 340 to process streams of user data from one or more RRUs 200. The network control point 380 maps (block 1402) the digital streams of user data for output through optical fibers of the data transport network 310 for transport to selected ones of the MUs 340 responsive to the utilization information. Accordingly, the network control point 380 can adapt to the present loading of each of the MUs 340 by mapping and remapping individual ones of the digital streams of user data to different optical fibers for transport to different ones of the MUs 340 to obtain a desired utilization of particular MUs 340.

The POINT DB node 350 can function as a repository for the resource information that identifies logical associations between each of the streams of user data and each of the RRUs 200. The CM/IM node 360 may be configured to access the resource information in the POINT DB node 350 to select one of the streams of user data among the received streams of user data for output through an optical fiber toward one or more of the MUs 340.

The CM/IM node 360 may be configured to receive (e.g, from one or more of the C-POINTs 320,330) bandwidth utilization information for a plurality of optical fibers that are available for transporting the streams of user data toward one or more of the MUs 340, and map the streams of user data for output among selected ones of the optical fibers responsive to the bandwidth utilization information.

The CM/IM node 360 may be configured to receive utilization information for the MUs 340, and map the streams of user data for output through optical fibers for transport to selected ones of the MUs 340 responsive to the utilization information.

Figure 4:
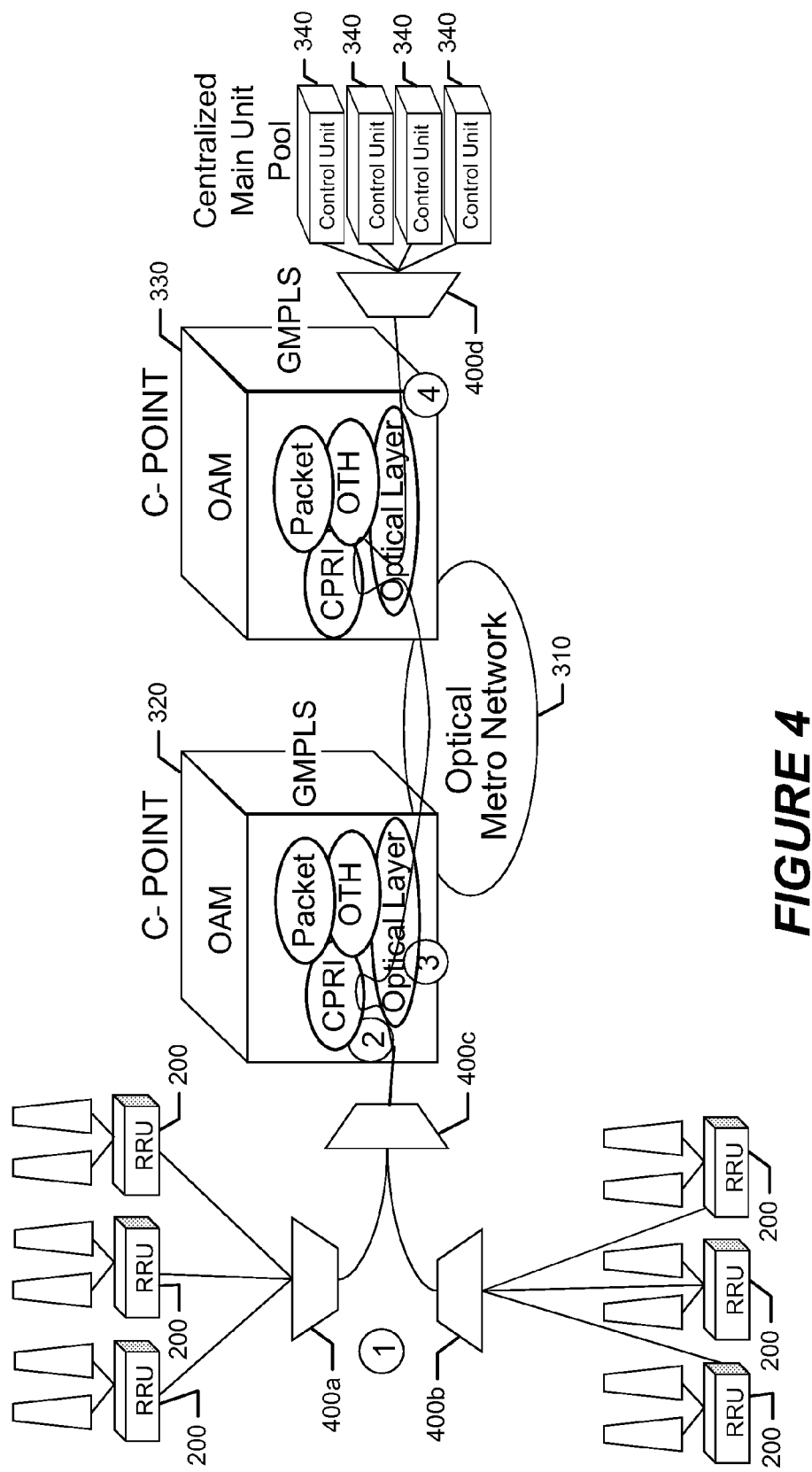
FIG. 4 is another block diagram of a mobile communications system configured to support the CPRI protocol.

FIG. 4 is a block diagram of a mobile communications system configured according to some other embodiments to support the CPRI protocol. The mobile communications system of FIG. 4 can operate in a similar manner to the system of FIG. 3, expect for a different illustrated architecture for aggregating the transport data streams.

In the example system, each RRU 200 receives antenna signals from the connected antennas 202, downconverts each of the antenna signals to a baseband signal, converts each of the baseband signals to a digital stream of user data, and converts each of the digital streams of user data to optical signals having different optical wavelengths for output to an optical fiber.

Optical signals from groups of the RRUs 200 (e.g., groups of 3 shown in FIG. 4) are combined by passive optical (wavelength) multiplexers 400a,b and then further combined by a passive optical multiplexer 400c for communication through the data transport network 310 (which can be a metropolitan network), under the control of the C-POINTs 320,330 and other control and management functionality described above.

The C-POINTs 320,330 can be configured to provide similar control and management functionality as a POINT in a metro/aggregation network. The C-POINTs 320,330 can be collocated with respective POINT nodes and can share common facilities therewith, such as by sharing optical transport and connectivity control mechanisms.

Each C-POINTs 320,330 can include a control and management functional layer that performs the CPRI protocol ("CPRI"), a control and management functional layer for processing data packets ("Packet"), a optical transport and control layer (Optical Transport Hierarchy "OTH"), and an optical (fiber and wavelength) layer that includes optical transceiver components ("Optical Layer"). The OTH layer can perform multiplexing and routing of different optical channel wavelengths into or out of single mode fiber, etc, to map from one wavelength to another between the data transport network 310 and the multiplexers 400c,400d. The CPRI layer can multiplex many lower speed CPRI streams into a higher rate aggregated CPRI stream that is then communicated through the data transport network 310.

Figure 1:
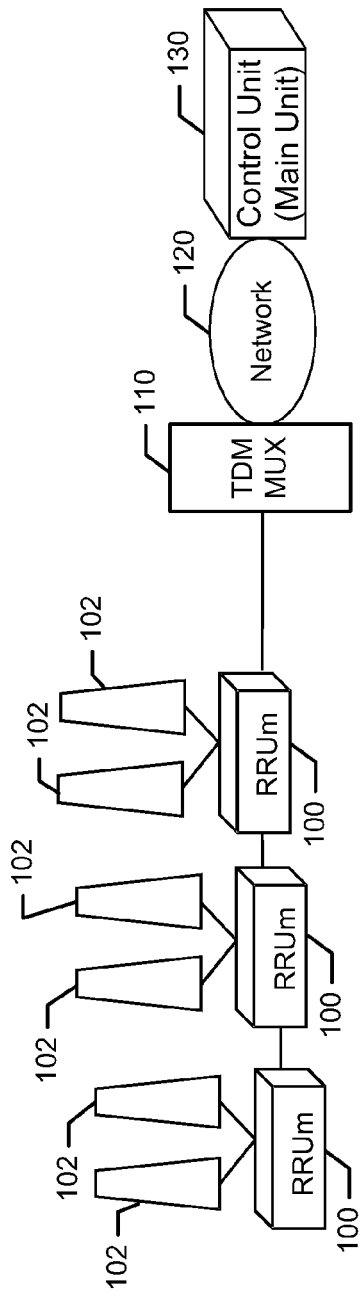
FIG. 1 is a block diagram of a conventional mobile communications system.
Figure 5:
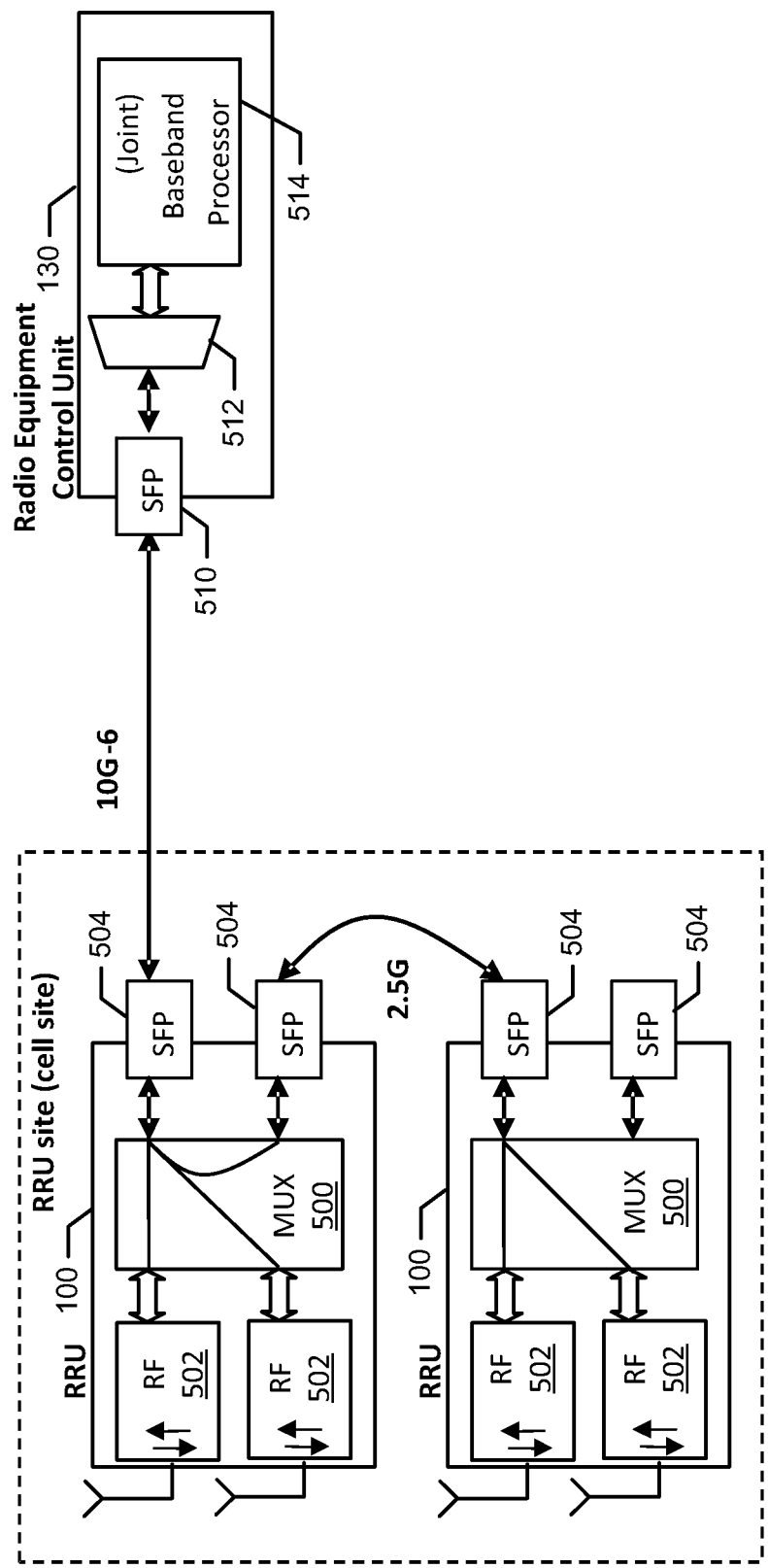
FIG. 5 is a block diagram illustrating conventional elements of the RRUs and the MU of FIG. 1.

FIG. 5 is a block diagram illustrating conventional elements of two RRUs 100 and the MU 130 of FIG. 1. Each RRU 100 has two antenna ports that supply received antenna signals to a pair of RF transceivers 502. The RF transceivers 502 convert the antenna signal to respective baseband digital signals that are combined by a multiplexer 500 using time division multiplexing to provide a TDM CPRI signal. Each RRU 100 includes two pluggable optics ports (SFP) 504 for uplink connectivity. Because the RRUs 100 are daisy chained, the TDM CPRI signal output by one RRU 100 is fed through a 2.5 Gbps optical link to the input of the other RRU 110 for further time division multiplex combining with the TDM CPRI signal output by that RRU 100. The daisy chaining and time division multiplex combining is sequentially performed by further RRUs to generate an aggregated TDM CPRI signal (e.g., about 10 Gbps) which is fed through a shared fiber to the MU 130. The MU 130 receives the aggregated TDM CPRI signal through a SFP 510 and demultiplexes the streams (via a demultiplexer 512) processing by a baseband processor 514 and subsequent radio base station processing.

As explained above, the aggregated TDM CPRI signal masks the individual data streams from individual antennas of each RRU 100. Consequently, control and management layers of a data transport network cannot readily control the transport and/or routing of the individual antenna data streams.

In the example system of FIG. 5, each RRU 100 can include a 6-10 Gbps SFP 504 for communication with the data transport network, and further include a 2.5 Gbps SFP 504 for communication between the RRUs 100. Because the aggregated TDM CPRI signal has a relative high data rate (e.g., about 10 Gbps), the SFPs 504,510 and other electro-optical components of the RRUs 100, MUs 510, and the data transport network have increased complexity and cost. The cost and complexity is further increased when wave division multiplexing is used, where it is further beneficial of the RRU optics is tunable. The tunability is typically needed for deployment, e.g., where one type of optics is desired to be used regardless of the RRU.

Figure 6:
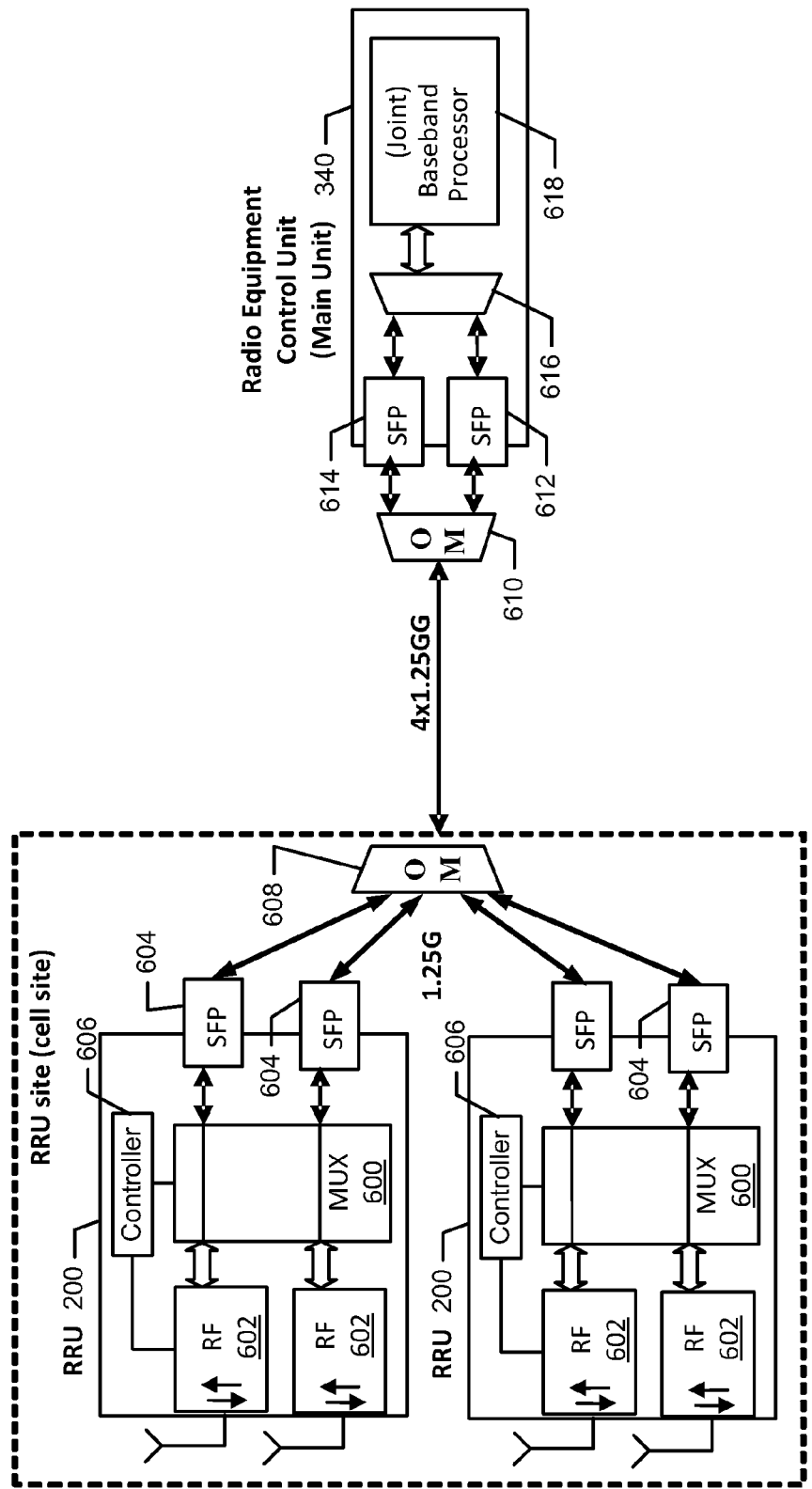
FIG. 6 is a block diagram illustrating elements of the RRUs and the MU of FIGS. 2 and 3 according to some embodiments of the present invention.
Figure 8:
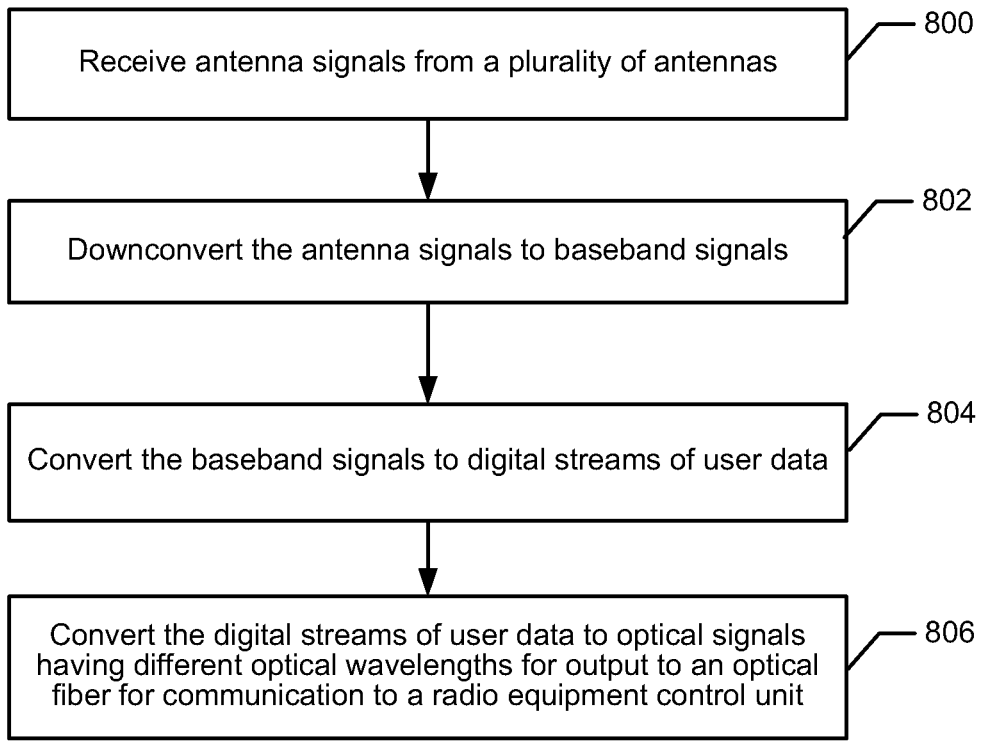
FIG. 8-14 are flowcharts of operations and methods that may be performed by one or more elements of a mobile communications system according to some embodiments of the present invention.
Figure 9:
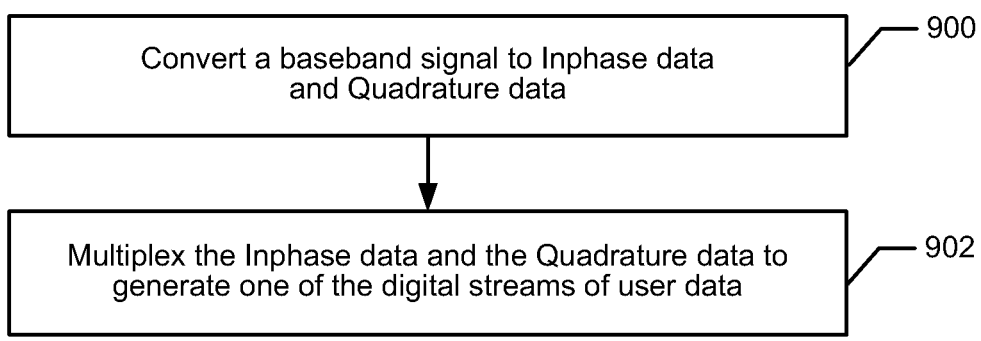

FIG. 6 is a block diagram illustrating elements of the RRUs 200 and the MU 340 of FIGS. 2 and 3 according to some embodiments of the present invention. FIGS. 8 and 9 are flowcharts of operations and methods that may be performed by the RRUs 200.

Referring to FIGS. 6, 8, and 9, each RRU 200 has two antenna ports that supply received antenna signals to a pair of RF transceivers 602. The RF transceivers 502 receive (block 800 of FIG. 8) antenna signals from a plurality of antennas 202. Each RF transceiver 502 downconverts (block 802 of FIG. 8) the antenna signal to a baseband digital Inphase data and Quadrature data, and converts (block 804 of FIG. 8, block 900 of FIG. 9) the baseband digital Inphase data and Quadrature data into a digital stream of user data. The separate CPRI streams of user data are passed through a multiplexer 600 which can multiplex (block 902 of FIG. 9) the Inphase data and Quadrature data for each of the digital streams of user data into respective CPRI data streams. The multiplexer 600 may output each of the CPRI data streams containing alternating digital representations of the Inphase data and Quadrature data.

The multiplexer 600 may be configured to separate switch the CPRI data streams to different SFPs 604 under the control of a controller 606. The controller 606 can control switching responsive to commands from the MUs 340 and/or the network control point 380.

The SFPs 604 convert (block 806, FIG. 8) each of the CPRI data streams to optical signals having different optical wavelengths that are combined by a passive optical (wavelength) multiplexer 608 for output on an optical fiber toward the MU 340.

The controller 606 may generate control data that is communicated to the MU 340 to control operation of the MU 340. The SFP 604 can convert the control data to a different optical wavelength from the wavelengths of the CPRI data streams for output to the optical fiber for communication to the MU 340.

A passive optical multiplexer 610 demultiplexes the CPRI data streams, where were transported using different optical wavelengths, into separate CPRI data streams that are provided to a plurality of SFPs 612. The SFPs 612 each covert a CPRI data stream into digital CPRI data that may be further demultiplexed (via a demultiplexer 616) and processed by a baseband processor 514 and subsequent radio base station processing.

As explained above, because the CPRI data stream from each antenna is carried by a different optical wavelength through a data transport network, their transport and routing can be separately controlled by control and management layers of the data transport network.

Moreover, lower speed components may be used in the RRUs, MU, and network, which may result in a lower cost and/or complexity of the system. For example, as shown in FIG. 6, 1.25 Gbps WDM-PON ports 604 and one passive optical mux 608,610 can be used on the RRU and MU sides. The WDM-PON optics of the RRUs 200 are tunable (colorless), which may be performed using reflective semiconductor optical amplifier (RSOA) technology. Thus, only one type of RRU optics is needed.

Figure 7:
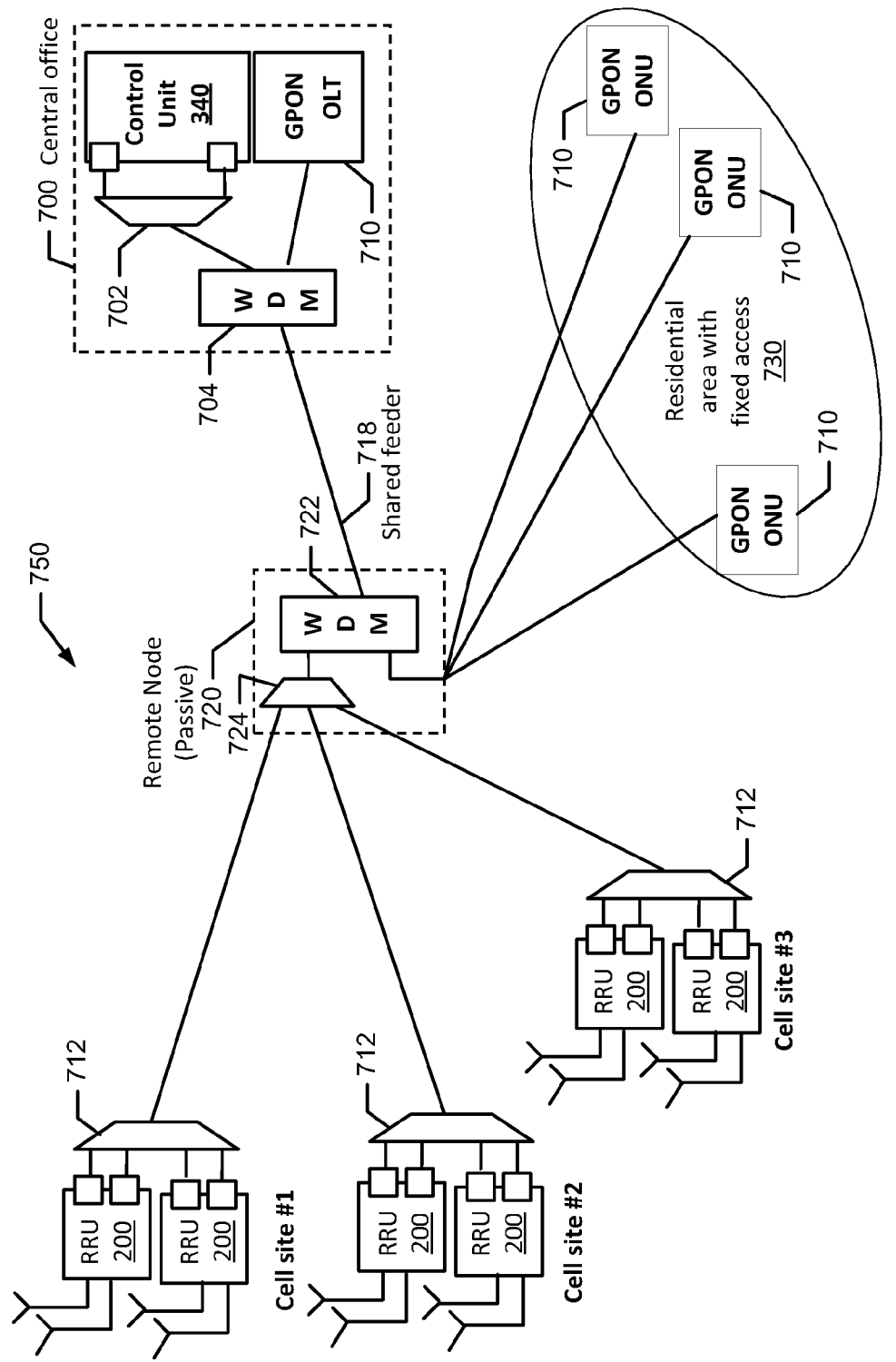
FIG. 7 is another block diagram of a mobile communications system according to some embodiments of the present invention.

FIG. 7 is another block diagram of a mobile communications system 750 according to some embodiments of the present invention. The system includes a plurality of RRUs 200 that are grouped at a plurality of geographically dispersed cell sites. The CPRI data streams from each RRU 200 are combined by passive optical multiplexers 712 for communication through a remote node 720 to a central office 700.

The remote node may include all passive optical components, such as the illustrated demultiplexer 724 and wave division multiplexer (WDM) 722. The WDM 722 can combine the CPRI data streams from the various RRUs 200 for communication through a shared optical feeder 718 to a corresponding WDM 704 that demultiplexes the CPRI data streams at the central office 700. The CPRI data streams can be provided through another demultiplexer 702 to a control unit 340. The control unit 340 may generate control data that is communicated to selected RRUs 200 to control their reception/transmission of signals and/or communicated to the network control point 380 to control the transport and/or routing of particular ones of the CPRI data streams. The control data may, for example, indicate bandwidth utilization particular optical fibers and/or utilization information for one or more of the MUs 340.

The system can further include and co-exist with GPON (gigabit passive optical network) optical network units (ONU) 710 that communicate data streams to/from end-user equipment (e.g., residential area equipment with fixed network access). The remote node 720 can include a power splitter that splits the CPRI signal streams from CPON signals from the residential area equipment, and maps separate CPON signals to different wavelength(s) from the CPRI signal streams. The WDM 704 at the central office 700 can demultiplex the CPON signal for delivery to the GPON optical line terminal (OLT) 710. Accordingly, the shared feeder 718 can carry both CPRI data streams from the RRUs 200 and CPON signals from the residential area equipment or other fixed access equipment. This architecture may entirely new ways of co-designing and managing backhaul and antenna (mobile) solutions.

The RRUs 200 can be connected to a backhaul network via WDM-PON (passive optical network) interfaces, such as using WDM-PON SFP Pluggable units into CPRI ports of the RRUs 200. The same approach can be used for ports on the side of the MUs 340. The WDM-PON equipment can be self-configuring, such as by the ONT on the RRU side (or MU side) being configured to automatically tune to whatever wavelength is assigned to them by the optical distribution network. Accordingly, there is no requirement for explicit connectivity management.

With wavelength reuse, combined with availability of many fiber strands to each site, there may not be a need for spare backhauling capacity from each RRU in the access network. For example, each fiber strand can typically support 80+, and up to 400 with future technology improvement, logical point-to-point channels between an RRU and the OLT on the C-POINT.

As explained above, the antennas 202 (antenna-carriers) are connected via feeder cable to the RRU drive (as receivers and/or transmitters) CPRI traffic. Normally with CPRI solutions, traffic coming from different antennas 202 served by the same RRU 200 is multiplexed before being mapped to the SFP port as one aggregated CPRI flow. However, in accordance with various embodiments, this is avoided by mapping each antenna-carrier to its own port and hence its own optical wavelength. Optical multiplexers can then be used to map different wavelengths onto the same port/fiber strand when desired. The effect from not aggregating many antenna-carrier pairs over the same optical wavelength is that the required transmission speeds over the interfaces can be constrained to lower levels, e.g., under 1 Gbps. This can allow use of lower cost optical components in the systems.

Moreover, as explained above, the more devices that are connected directly using their own wavelengths, the more visible the radio resources become at the network control point. When each antenna-carrier is mapped directly onto a different WDM-PON wavelength, full visibility of all antennas is enabled at the network control point. The antenna can thereby be under the same control infrastructure, e.g. via GMPLS, as other "connectivity resources" in the Packet-Opto network.

Traffic entering the OLT located on the C-POINT node, can be handled in many ways in view of the abundant resources that are available for access (many wavelengths available to each RRU for use on all fiber strands), combined with a CPRI multiplexer in the C-POINT that has the capability to aggregate CPRI before entering the metro network (data transport network), where resources are scarce. Simpler designs of the RRUs may thereby be realized by not requiring the use of CPRI mux/demux on each RRU and, instead, may be centralized at the C-POINT.

When, for example, the CPRI flow is carried over an optical wavelength from/to the RRU, it is not necessary to multiplex or analyze the CPRI flow at the C-POINT. Instead, the CPRI flow can be mapped transparently towards the transport side on its way back and from the MU/BBU. The C-POINT may acquire this knowledge by, for example, preconfigured information that is accessible in tables and/or by information signalled via connectivity control mechanisms such as GMPLS or others.

When an optical wavelength signal carries low-speed traffic, e.g. traffic from a single antenna-carrier, it may be advantageous to terminate the optical wavelength signal on the C-POINT CPRI mux/demux. This will allow the CPRI mux/demux of point to concentrate traffic from many low speed sources/RRUs before forwarding this traffic over the transport network. Reasons for doing this are many, e.g. that the resources in the transport network may be scarce and cannot be treated as "wastefully", and the connectivity management in the transport network are preferably performed in "bulk" and so it is worthwhile to reduce the number of wavelengths to handle there.

Other potential advantageous that may be provided by various embodiments can be include the following.

Because of the colorless feature of WDM-PON ONU optics, all RRU optical modules can be the same type, which can reduce lifecycle costs (including spare part handling) and may simplify deployment logistics.

The MUs and RRUs may be simplified by not having to include high-rate CPRI multiplexing functions (ie simplified MU, RRU design) since high data rate signals, and signal multiplexing, is not required.

Each RRU site can scale with a large number of antennas. As more antennas/RRUs are deployed, these can be backhauled with WDM technology without disturbing already deployed RRUs.

WDM-PON allows for asymmetric data rates (to/from the MU). When, for example, more Rx antennas than Tx antennas are used, WDM-PON can be used for the MU-RRU transport.

Different wireless operators sharing a RRU site can share the fiber connecting to the site although they may have different CPRI implementations etc. The wavelengths of these operators can further be directed to different central offices.

Several RRU sites can be combined on the same feeder fiber, eg shared with other fiber access systems such as p2p fiber, GPON, EPON etc.

Long term evolution (LTE)-Advanced rates can be supported by carrier aggregation implemented by individual optical wavelengths. Compression of IQ-data can enable use of low speed optical interfaces.

More dynamic control of end-to-end connectivity all the way to individual antennas may be provided by piggybacking on existing control mechanisms on POINT, e.g. GMPLS.

Simpler RRU designs, with no (or minimum) CPRI multiplexing on each C-POINT may enable simpler solutions towards the RRU side. RRUs, and also individual antenna-carriers on RRUs, can be transported towards C-POINT on individual wavelengths with WDM-PON, since there is an abundance of capacity on fiber in the access. The C-POINT can then terminate such wavelengths and aggregate low rate CPRI flows into higher rate ones before injecting the aggregated CPRI traffic onto the transport network.

Better topology visibility and control of connections to RRUs from one single point may be achieved in contrast to hiding large parts of the topology behind vendor specific CPRI connectivity and topology data mechanisms.

Reuse of existing optical transport facilities available for SDH, OTH, WDM, MPLS, Ethernet and other technologies may be provide in the POINT. Simpler coexistence and migration from packet based to CPRI based solutions may be provided.

More resilient solutions, e.g. forwarding the aggregated CPRI traffic from C-POINT to another MU pool if the regular pool is lost, may be provided. Load balancing onto baseband processing, since CPRI connections can be controlled individually from one C-POINT, and MUs can be chosen semi-dynamically, may be provided.

ABBREVIATIONS

BBU—Baseband Unit
CPRI—Common Public Radio Interface
GMPLS—Generalized Multiprotocol Label Switching
MU—Main Unit
OLT—Optical Line Terminal
PON—Passive Optical Network
POINT—Packet-Opto Integration Node
RRU—Remote radio Unit
WDM—Wavelength Division Multiplexing Further Definitions and Embodiments When an element is referred to as being "connected", "coupled", "responsive", or variants thereof to another element, it can be directly connected, coupled, or responsive to the other element or one or more intervening elements may be present. In contrast, when an element is referred to as being "directly connected", "directly coupled", "directly responsive", or variants thereof to another element, there are no intervening elements present. Like numbers refer to like nodes/elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or", abbreviated "/", includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but do not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block/operation of the block diagrams, flow diagrams, and/or flowchart illustrations, and combinations of blocks/operations in the block diagrams, flow diagrams, and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts/operations specified in the block diagrams, flow diagrams, and/or flowchart block/operation or blocks/operations. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block/operation of the flowcharts, flow diagrams, and/or block diagrams may be separated into multiple blocks/operations and/or the functionality of two or more blocks/operations of the flowcharts, flow diagrams, and/or block diagrams may be at least partially integrated. Finally, other blocks/operations may be added/inserted between the blocks/operations that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Other remote radio units, radio base stations, and network control points and/or methods according to embodiments of the invention will be or become apparent to one with skill in the art upon review of the present drawings and description. It is intended that all such additional remote radio units, radio base stations, and network control points and/or methods be included within this description, be within the scope of the present invention, and be protected by the accompanying claims. Moreover, it is intended that all embodiments disclosed herein can be implemented separately or combined in any way and/or combination.

What is claimed is:

1. A radio base station comprising:
a plurality of remote radio units each configured to:
receive antenna signals each from a different antenna;
downconvert each of the antenna signals to a baseband signal;
convert each of the baseband signals to a digital stream of user data; and
convert each of the digital streams of user data to optical signals having different optical wavelengths for output to an optical fiber for communication to a radio equipment control unit;
a data transport network comprising a plurality of optical fibers communicatively connected to each of the remote radio units to receive the optical signals;
a radio equipment control unit connected to the data transport network to receive the optical signals, and configured to select among the remote radio units and generate control data that is communicated through the data transport network to control operation of the selected remote radio unit; and
a network control point containing resource information identifying which remote radio units are connected to which optical fibers of the data transport network, and configured to select a digital stream of user data of one of the optical fibers from among the digital streams of user data of other optical fibers responsive to the resource information, and to control routing of the selected digital stream of user data through the data transport network.

2. The radio base station of claim 1, wherein each of the remote radio units convert Common Public Radio Interface, CPRI, streams of user data to the optical signals, and output the optical signals to a CPRI optical fiber link toward the radio equipment control unit.

3. The radio base station of claim 1, wherein each of the remote radio units convert each of the baseband signals to Inphase data and Quadrature data that is output as the digital stream of user data.

4. The radio base station of claim 3, wherein each of the remote radio units multiplex the Inphase data and the Quadrature data into a serial data stream that is output as the digital stream of user data.

5. The radio base station of claim 4, wherein each of the remote radio units output each of the serial data streams with alternating digital representations of the Inphase data and the Quadrature data.

6. The radio base station of claim 1, wherein each of the remote radio units generate control data for use in controlling the radio equipment control unit, and covert the control data to a different optical wavelength from the wavelengths of the digital streams of user data for output to the optical fiber of the remote radio unit for communication toward the radio equipment control unit.

* * * * *